US007534000B1

United States Patent
Adachi et al.

(10) Patent No.: US 7,534,000 B1
(45) Date of Patent: May 19, 2009

(54) INCORPORATION OF TELLTALE WARNING INDICATORS INTO DRIVER INFORMATION CENTER

(75) Inventors: Masaki Adachi, Ann Arbor, MI (US); Ching Fong, Canton, MI (US); Zinoviy Kelman, Bloomfield Hills, MI (US); Joseph A Pasek, Northville, MI (US); Brian Dehmlow, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 164 days.

(21) Appl. No.: 11/541,502

(22) Filed: Sep. 29, 2006

Related U.S. Application Data

(60) Provisional application No. 60/722,825, filed on Sep. 30, 2005.

(51) Int. Cl.
*G01D 11/28* (2006.01)
(52) U.S. Cl. .............................. 362/23; 362/26; 362/27; 362/28; 362/29; 362/489; 362/546
(58) Field of Classification Search .................. 362/23, 362/26–29, 489, 546
See application file for complete search history.

(56) References Cited

U.S. PATENT DOCUMENTS 5,017,916 A    5/1991    Londt et al.
5,063,379 A *  11/1991   Fabry et al. .................... 349/68
6,597,367 B2   7/2003    Geisler
6,741,223 B2   5/2004    Kobayashi et al.
6,995,661 B2   2/2006    Amari
7,066,630 B1 * 6/2006    Venkatram ................... 362/489
2002/0149495 A1* 10/2002  Schach et al. .......... 340/815.78

OTHER PUBLICATIONS

U.S. Appl. No. 11/157,013, filed Jun. 20, 2005, Fong.

* cited by examiner

*Primary Examiner*—Sandra L O'Shea
*Assistant Examiner*—Meghan K Dunwiddie
(74) *Attorney, Agent, or Firm*—Harness, Dickey & Pierce, P.L.C.

(57) ABSTRACT

A vehicle display having an LCD display that is employed to communicate a first type of vehicle information and a second set of vehicle information in which the information that is to be communicated can include or consist of symbols. A display light guide is employed to distribute light from two light sources to selectively illuminate portions of the display screen of the LCD display. The LCD display can be employed to generate telltale warning indicators. The LCD display provides flexibility in the display of information so that a relatively large quantity of telltale warning indicators can be handled without specifically dedicating a light source, a light tunnel and space on the vehicle display for each telltale warning indicator that may be employed in a vehicle.

20 Claims, 6 Drawing Sheets

INCORPORATION OF TELLTALE WARNING INDICATORS INTO DRIVER INFORMATION CENTER

CROSS-REFERENCE TO RELATED APPLICATIONS

This application claims the benefit of U.S. Provisional Patent Application Ser. No. 60/722,825 entitled "Incorporation of Telltale Warning Indicators into Driver Information Center" filed Sep. 30, 2005, the disclosure of which is hereby incorporated by reference as if fully set forth in detail herein.

INTRODUCTION

The present disclosure generally relates vehicle gages and more particularly to a vehicle gage having a central display for communicating a first set of data, such as alpha-numeric messages and/or graphical information, to the vehicle operator, as well as for display of certain types of indicator messages through telltale indicators.

The complexity of automotive vehicles is increasingly complex. More systems, such as varieties of supplemental restraints, traction control, anti-lock brakes, etc., are integrated into automotive vehicles and as such, the amount of information that must be communicated to the vehicle operator increases in a corresponding manner.

One method for simplifying and consolidating the information that was communicated to the vehicle operator was through the use of telltale indicators, which provided status information for a particular vehicle system or fault. As compared with a gage or other means for determining the status or fault condition, telltale indicators take up comparatively little room. Typically an instrument panel is constructed so that a given telltale indicator is always located in a given position. If the instrument panel is used in a vehicle that does not require a particular telltale indicator (e.g., the vehicle is not equipped with cruise control and thus does not require a telltale indicator for the status of a cruise control system), the telltale indicator is typically present but is simply not utilized.

In the near future it may not be uncommon for a vehicle platform to utilize as many as 50 different types of telltale indicators. The use of so many telltale indicators in an instrument panel presents several problems, particular concerning the packaging of the telltale indicators and the effect of dedicated telltale indicators on the appearance and styling of the instrument panel. Accordingly, there remains a need in the art for a vehicle gage that further simplifies and consolidates the information that must be communicated to a vehicle operator.

SUMMARY

In one form, the present teachings provide a vehicle display that includes a display housing, a liquid crystal display (LCD), a display light guide, a first light source and a second light source. The display housing segregates the first light source from the second light source. The LCD is coupled to the display housing and includes a display screen. The display screen includes a first portion, which is selectively operable for displaying a first set of vehicle data, and a plurality of second portions that are selectively operable for displaying a second set of vehicle data. The display light guide is disposed between the LCD and the first and second light sources. The first light source is selectively operable such that light generated by the first light source is transmitted through the display light guide and back illuminates the first portion of the display screen. The second light source is comprised of a plurality of light source sets. Each of the light source sets is selectively operable such that light generated by each of the light source sets is transmitted through the display light guide and back illuminates an associated one of the second portions of the display screen.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
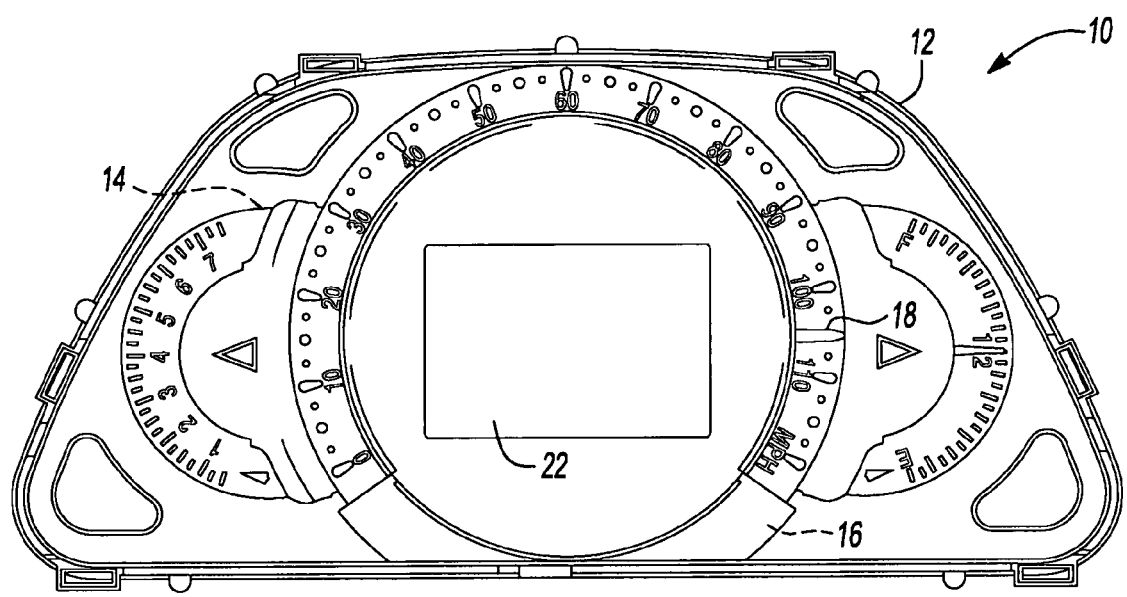
FIG. 1 is a front plan view of a vehicle gauge having a display constructed in accordance with the teachings of the present disclosure.

With reference to FIG. 1 of the drawings, a vehicle gage 10 having a display 22 that is constructed in accordance with the teachings of the present invention. The gauge 10 can include a housing 12, a circuit board assembly 14, a motor assembly 16, a pointer 18, and a display 22. The circuit board assembly 14, motor assembly 16, pointer 18 and light guide 20 can be constructed in a manner that is described and illustrated in commonly assigned co-pending U.S. patent application Ser. No. 11/157,013 filed Jun. 20, 2005 entitled "Vehicle Gage With Embedded Driver Information", the disclosure of which is hereby incorporated by reference as if fully set forth herein. It will be appreciated that while the vehicle gage 10 is illustrated as including an analog-type gage, those of ordinary skill in the art will appreciate that the teachings of the present invention have applicability in various other types of vehicle gages.

Figure 2:
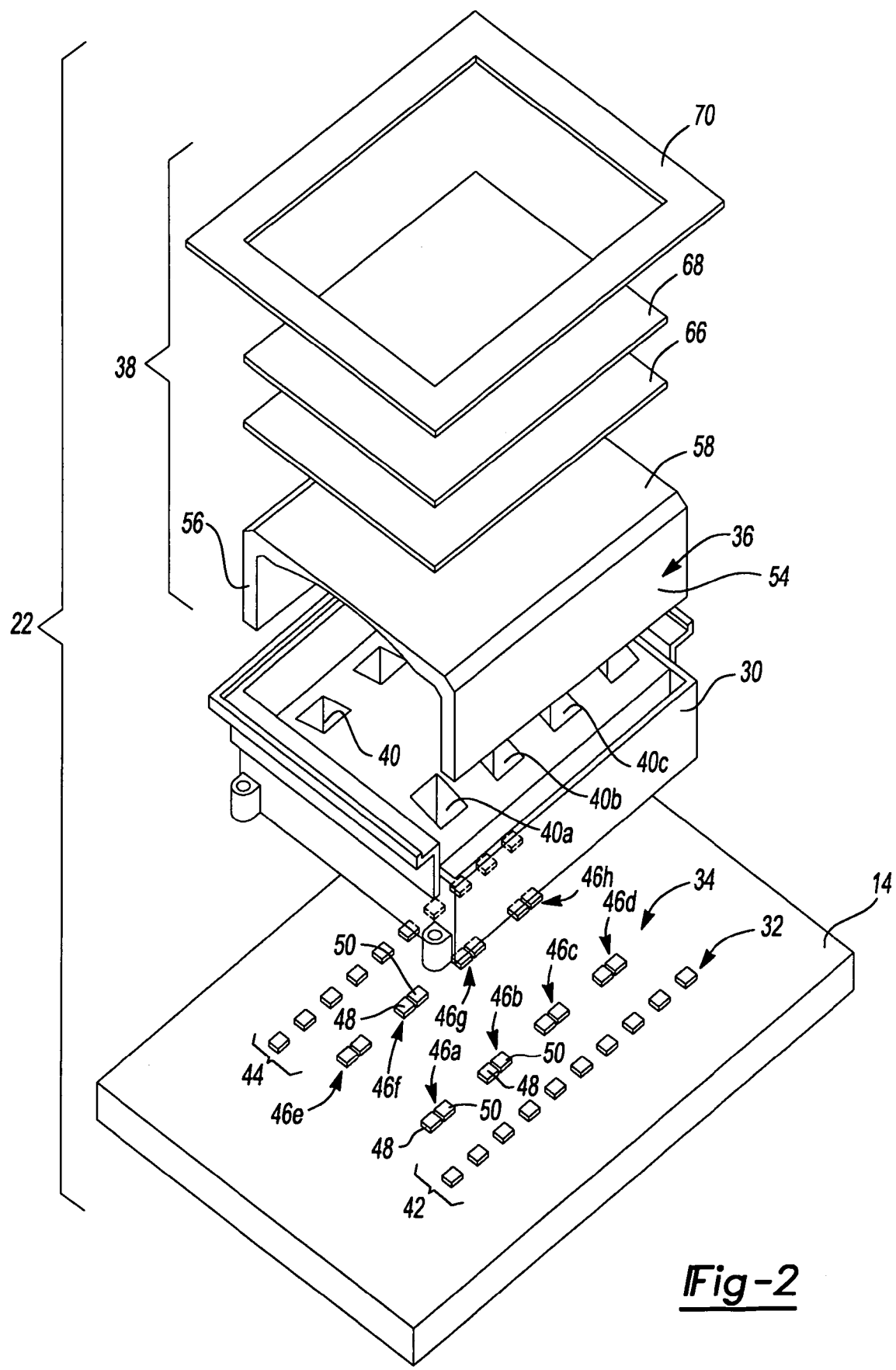
FIG. 2 is an exploded perspective view of a portion of the vehicle of FIG. 1 illustrating the construction of the display in greater detail.

With reference to FIG. 2, the display 22 can include a display housing 30, a first light source 32, a second light source 34, a display light guide 36 and a liquid crystal display (LCD) 38. The display housing 30 can be formed from any suitable material, such as an opaque plastic, and can define a plurality of telltale apertures 40. The display housing 30 can be fixedly coupled to the circuit board assembly 14.

The first light source 32 can be any suitable light source, such as one or more LED's, OLED's, Polymer LED's or incandescent lamps. In the particular example provided, the first light source 32 includes a first set of white LED's 42 and a second set of white LED's 44. The first light source 32 can be coupled directly to the display housing 30 but in the example provided, the first light source 32 is coupled directly to the circuit board assembly 14.

The second light source 34 can include a plurality of selectively illuminated light sources 46a through 46h, and each of the selectively illuminated light sources 46a through 46h can be coupled to the circuit board assembly 14 and disposed within a respective one of the telltale apertures 40. The selectively illuminated light sources 46a through 46h can include one or more of any appropriate light source, such as one or more LED's, OLED's, Polymer LED's and/or incandescent lamps. In the particular example provided, the selectively illuminated light sources 46a through 46h include a green LED 48 and a red LED 50. As one of skill in the art will appreciate, the green LED 48 and the red LED 50 may be illuminated simultaneously to provide yellow light. Accordingly, the light sources 46a through 46h may be selectively operated to produce green, red or yellow light.

The display light guide 36 can be unitarily formed of a clear plastic and can be configured to both employ light that is received from the first light source 32 to back-light the LCD 38 and to permit light generated by the second light source 34 to be transmitted directly therethrough. In the particular example provided, the display light guide 36 is generally U-shaped, having legs 54 and 56 that are aligned to the first and second sets of white LED's 42 and 44, respectively. Accordingly, light generated by the first and second sets of white LED's 42 and 44 is received by an associated one of the legs 54 and 56 and directed into a body portion 58 of the display light guide 36. The body portion 58 of the display light guide 36 can be constructed in a manner that is understood by those of ordinary skill in the art so as to escape forwardly (i.e., toward the rear of the LCD 38) to back-light the LCD 38. In this regard, the body portion 58 can define one or more light reflecting surfaces 58a that traverse a light transmission path 58b to thereby reflect light outwardly from the display light guide 36 when light is transmitted along the light transmission path 58b. In the particular example provided, the first light source 32 is configured to transmit light along the light transmission path 58b but those of skill in the art will appreciate that a vehicle display constructed in accordance with the teachings of the present disclosure could be configured otherwise. Also in the example provided, the light reflecting surfaces 58a have a contoured shape to purposefully reflect light in a fanned-out manner that can back-illuminate a relatively large area of the LCD 38.

Figure 3:
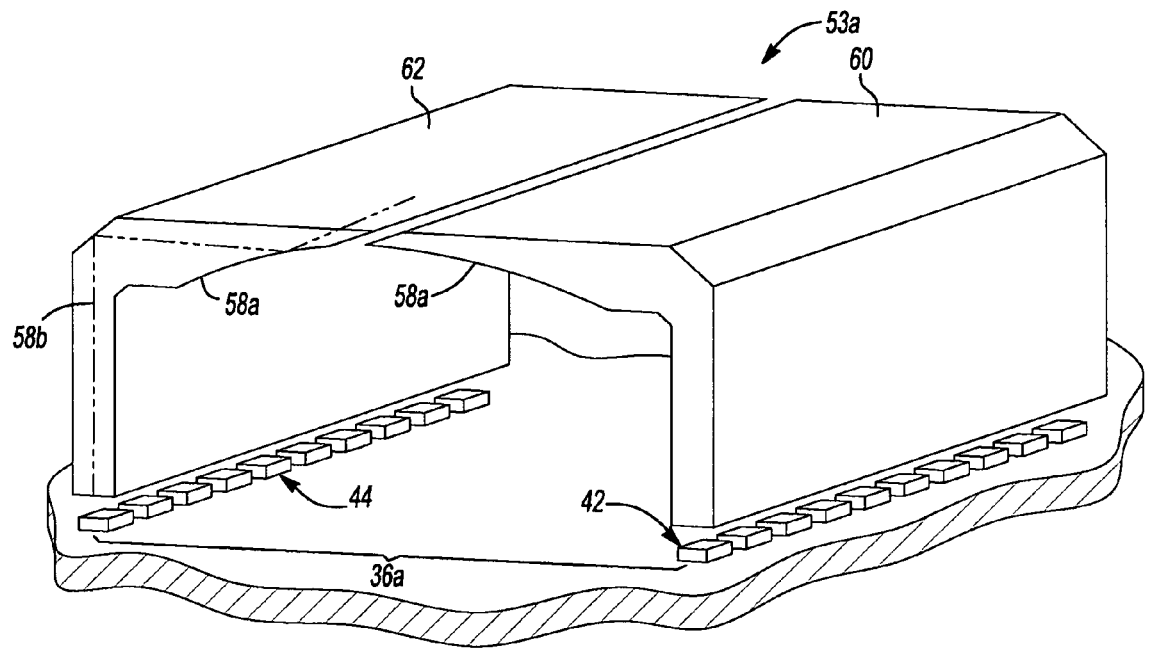
FIG. 3 is a perspective view of a portion of another display illustrating an alternately constructed display light guide.

With brief reference to FIG. 3, the body portion 58a of the display light guide 36a could be formed in the alternative with two distinct sub-portions: a first sub-portion 60 that is associated with the first set of white LED's 42 and a second sub-portion 62 that is associated with the second set of white LED's 44. In this embodiment, the first and second sets of white LED's 42 and 44 can be separately operated to permit corresponding portions of the LCD 38 to be separately back-lit.

Returning to FIG. 2, the LCD 38 can be configured in a manner that is well known in the art and as such, a detailed discussion of the construction and operation of these components need not be provided herein. Briefly, the LCD 38 can include a display diffuser 66, a display screen 68 and a lens 70. The display diffuser 66 can be employed to collect light emitted forwardly from the display light guide 36 and distribute this light uniformly into the display screen 68 through its rear surface. With additional reference to FIG. 4, the display screen 68 can be a STN-type display that defines a plurality of cells 76 that are spaced apart from one another and which are distributed uniformly over the area of the display screen 68. In the particular example provided, the display screen 68 is a "black & white" type of display that is capable of producing a plurality of relatively small pixels (cells 76) that may be selectively actuated on an individual basis so that each pixel may be configured to block the transmission of light therethrough or permit light to be transmitted therethrough. The lens 70 conventionally protects the display screen 68 and can optionally include one or more filters (not specifically shown) to filter out light of one or more predetermined wave lengths.

The display screen 68 can be coupled to the circuit board assembly 14 to permit vehicle data to be transmitted therebetween (the vehicle data can be obtained through communication between the circuit board assembly 14 and a vehicle controller (not shown) in a manner that is conventional and well known in the art). The vehicle data can include a first set of data and a second set of data. The first set of information can include "vehicle information", such as fuel mileage, a vehicle odometer, a trip odometer, and/or statements regarding the condition of a door (e.g., rear door open), oil change information (e.g., number of miles until an oil change is necessary or life of oil remaining expressed as a percentage). The second set of information can include information that can be transmitted to the vehicle operator through the display of a symbol (i.e., a telltale indicator). This information can include "status information", such as the status of a cruise control system (e.g., on or operating), the status of an anti-lock brake system (e.g., operating), the status of a traction control system (e.g., operating), the status of an automatically or manually engagable four-wheel drive system (e.g., engaged), the speed range of an automatically or manually engageable four-wheel drive system (e.g., high range, low range), as well as "fault information" such as an engine temperature fault (i.e., engine temperature exceeds a predetermined temperature), etc.

In operation, the LCD 38 can be employed to selectively generate messages that are displayed to the operator on the display screen 68. When information from the first set of information is to be displayed, the display 22 can illuminate all or part of the first light source 32 to backlight all or a portion of the display screen 68 so that the pixels 76 can be selectively controlled to block the transmission of light therethrough (to thereby appear "black"). The pixels 76 can be of a sufficiently small size so as to be capable of displaying alpha-numeric messages.

In situations where information from the second set of information is to be displayed, the display 22 can control the first light source 32 so that it does not back-illuminate the LCD 38 and can selectively control one or more of the light sources 46a through 46h depending upon the quantity of information that is to be displayed. For example, if the information from the second set of information that is to be displayed includes: cruise control status: on; driver door: open; and a fault in the brake level fluid, the display 22 can control the green LED 48 of the light source 46a, the green and red LED's 48 and 50 of the light source 46b and the red LED 50 of the light source 46c to illuminate portion of the LCD 38 that is in-line with respective telltale apertures 40. Simultaneously, the display screen 68 can be configured such that the pixels 76 that are in-line with the telltale aperture 40a to generate a symbol that is associated with cruise control, the pixels 76 that are in-line with the telltale aperture 40b to generate a symbol that is associated with the driver door and the pixels that are in-line with the telltale aperture 40c to generate a symbol that is associated with a fault in the brake level fluid. Accordingly, the second light source 34 can be employed to selectively back light distinct portions of the display screen 68 with a light of a selected color.

Figure 4:
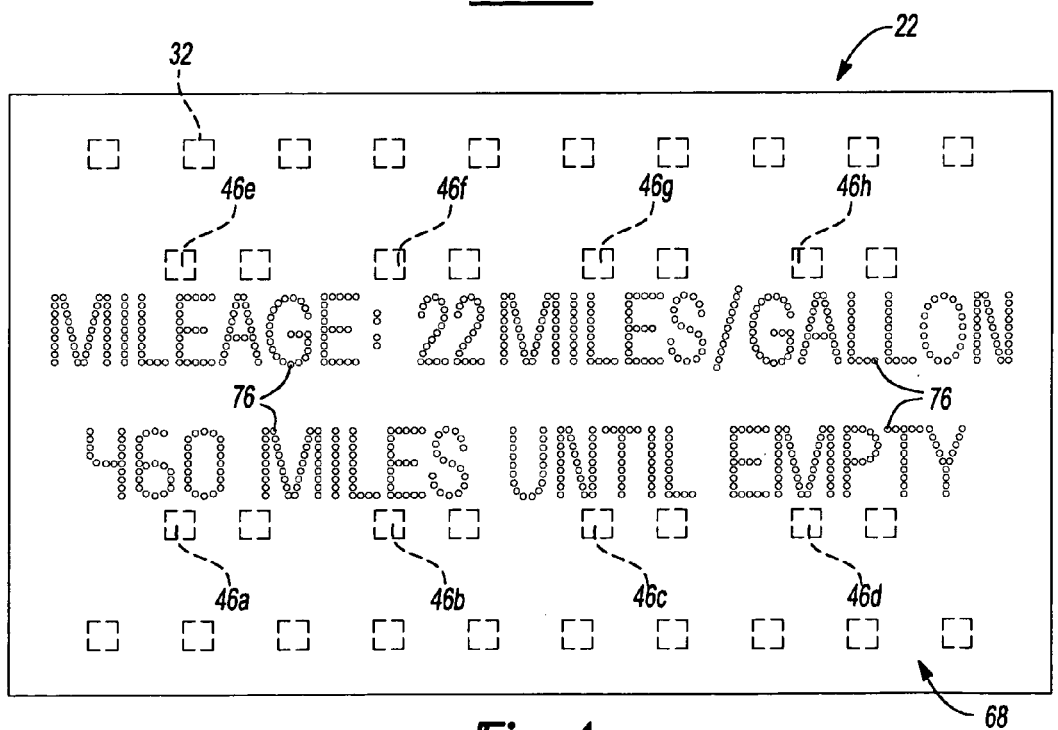
FIGS. 4 through 6 are a front views of a portion of the display illustrating the display screen in more detail.
Figure 5:
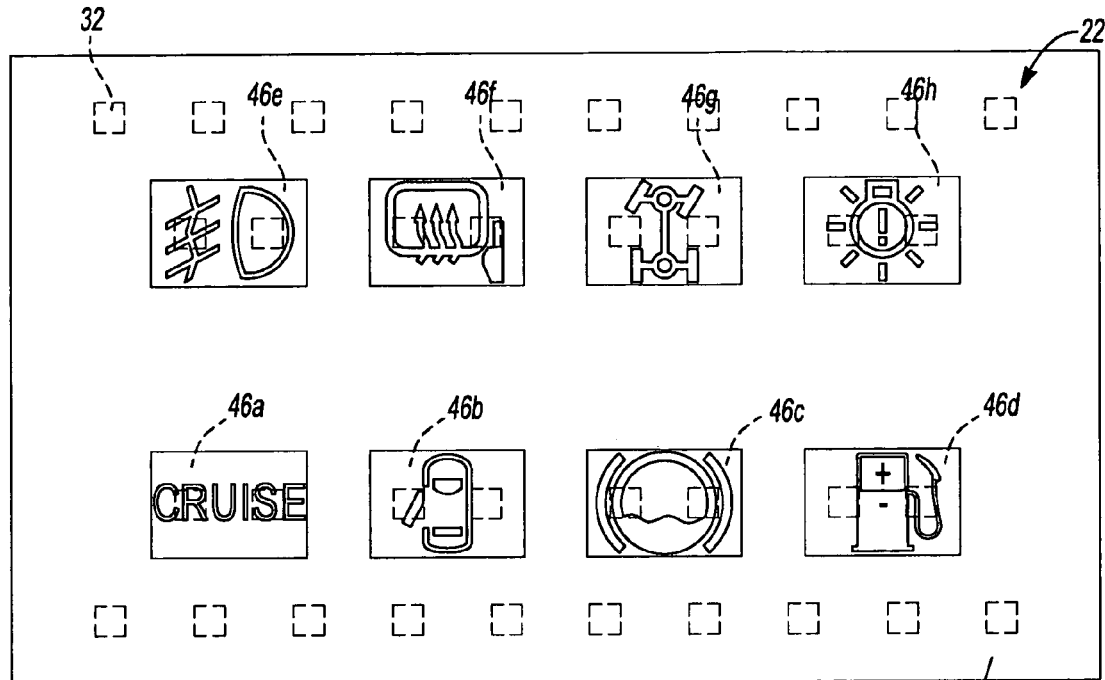
Figure 6:
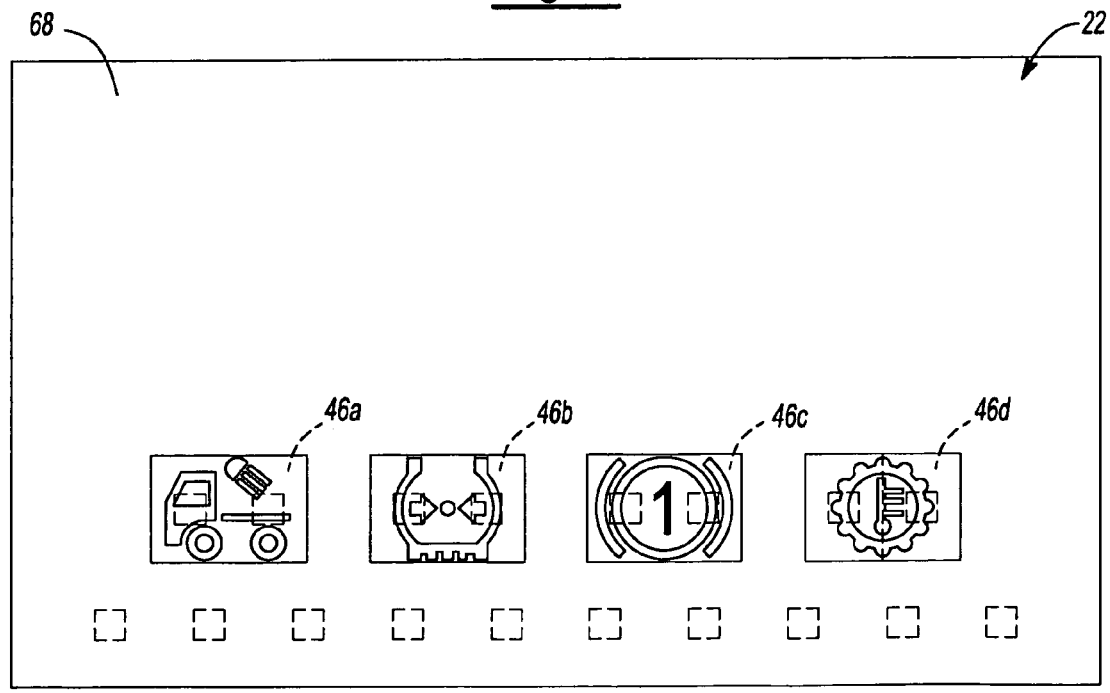

In the particular example provided, the telltale aperture 40a could be used exclusively for the indication of the status of the cruise control system or for the indication of another condition where yellow back-lighting is appropriate (e.g., an indication that the driver door is open in those instances where the cruise control system is not on) and the remaining telltale apertures 40b through 40h could be employed to communicate other data. In instances where more than eight telltales are to be displayed, the display 22 can be configured to share time amongst groups of telltales and optionally with the first set of information that is to be displayed. It will be appreciated, however, that as the LED's 46a through 46h are able to cooperate at each location to produce green, red and yellow light, the telltales need not be restricted to a particular location. FIGS. 4 through 6 illustrate an example wherein the display 22 shares time between various sets of information. In FIG. 4, the display screen 68 and the first light source 32 is employed to display the vehicle mileage and the distance (given the present amount of fuel remaining in the tank and the present vehicle mileage) until the fuel in the fuel tank is consumed. After a first predetermined amount of time has elapsed, the first light source 32 is turned off and the light sources 46a through 46h are illuminated to backlight portions of the display screen 68 with colored light that is appropriate for the telltale symbols that are generated by display screen 68 as shown in FIG. 5. After a second predetermined amount of time has elapsed, the light sources 46a through 46d are illuminated to backlight portions of the display screen with colored light that is appropriate for the telltale symbols that are generated by the display screen 68 as shown in FIG. 6. After a third predetermined amount of time has elapsed, the process may be repeated (i.e., the display screen 68 and the first light source 32 can be employed to display the vehicle mileage and the distance until the fuel in the fuel tank is consumed, after thereafter the telltale symbols may be displayed and illuminated in the manner described above). It will be appreciated that the first, second and third predetermined amounts of time (and any additional predetermined amount of time) may be set to any appropriate time interval and that the various time intervals may or may not have the same duration.

It will be appreciated by those of ordinary skill in the art that display time may be shared in various different ways. For example, the telltales could "scroll" from one side of the display to another. As another example, the display screen 68 could be split between upper and lower portions (as described above in connection with the discussion of the display light guide 36a) when both types of information is to be displayed so that the first set of information will be displayed on a first (e.g., lower) half of the display screen 68 and the second set of information will be displayed on a second (e.g., upper) half of the display screen 68. In situations where the amount of information to be displayed exceeds the space allocated thereto, the information may be scrolled across the display or displayed in alternating segments. In view of the foregoing discussion, it will be understood that the present invention is not to be limited by the particular time-sharing method disclosed herein.

Those of skill in the art will appreciate from this disclosure that in the particular example provided, the display light guide 36 can employ total internal reflection (TIR) to guide light from one of the light sources (i.e., the light generated by the first and second sets of white LED's 42 and 44) to backlight the LCD 38 when the display screen 68 displays the first set of information and that the light from the other one of the light sources (i.e., the light from the LED's 46a through 46h) can travel through or across the light guide 36 to directly back-illuminate the portion of the display screen 68 associated with a respective portion of the second set of information. Those of skill in the art will also appreciate from this disclosure that in some situations, the first and second sets of data may not be displayed simultaneously. Accordingly, when it is desirable to display the first and second sets of data, the LCD 38 can be configured to share time between first set of data and the second set of data (i.e., the LCD 38 could toggle between the first and second sets of data).

Figure 7:
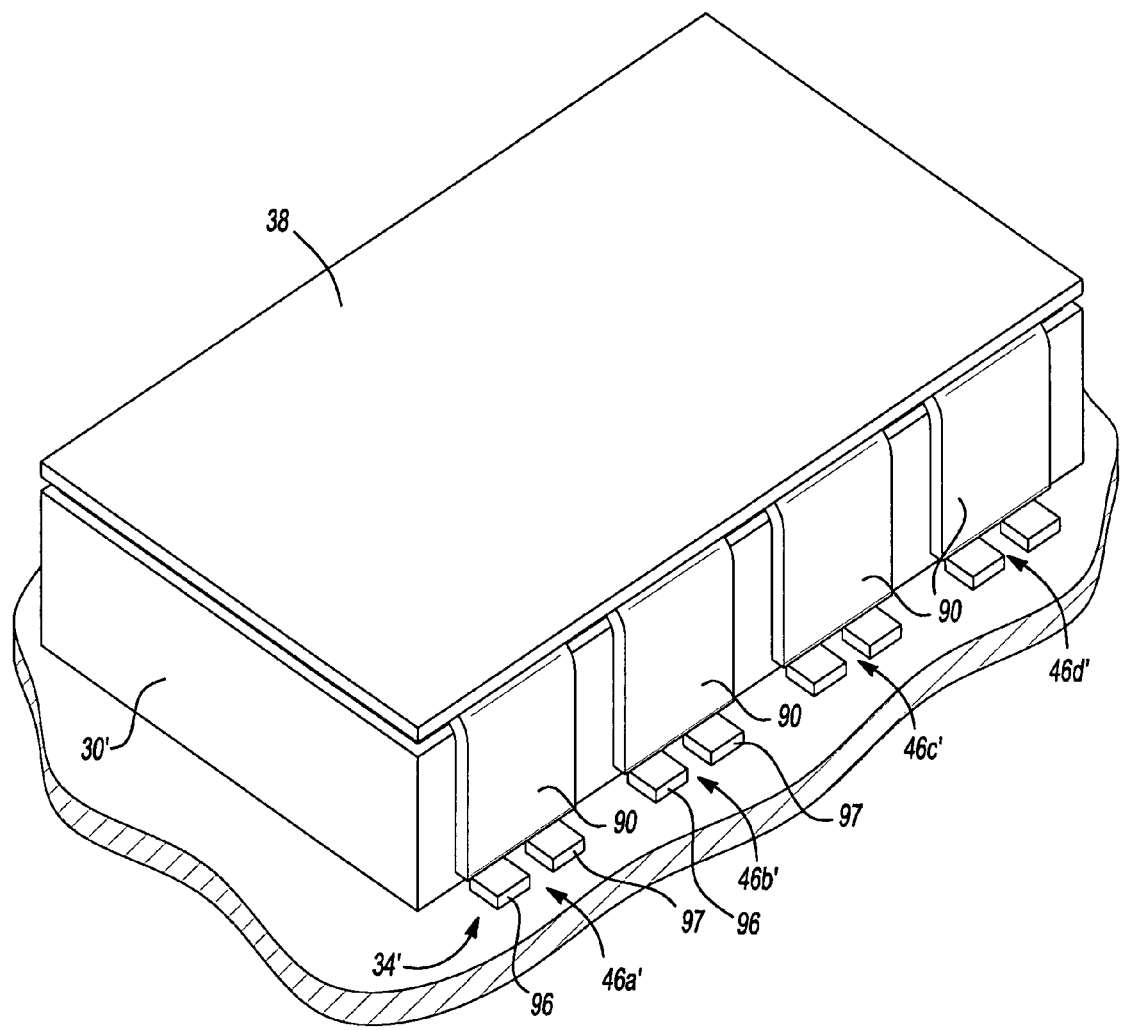
FIG. 7 is a perspective view of a portion of another display constructed in accordance with the teachings of the present disclosure.
Figure 8:
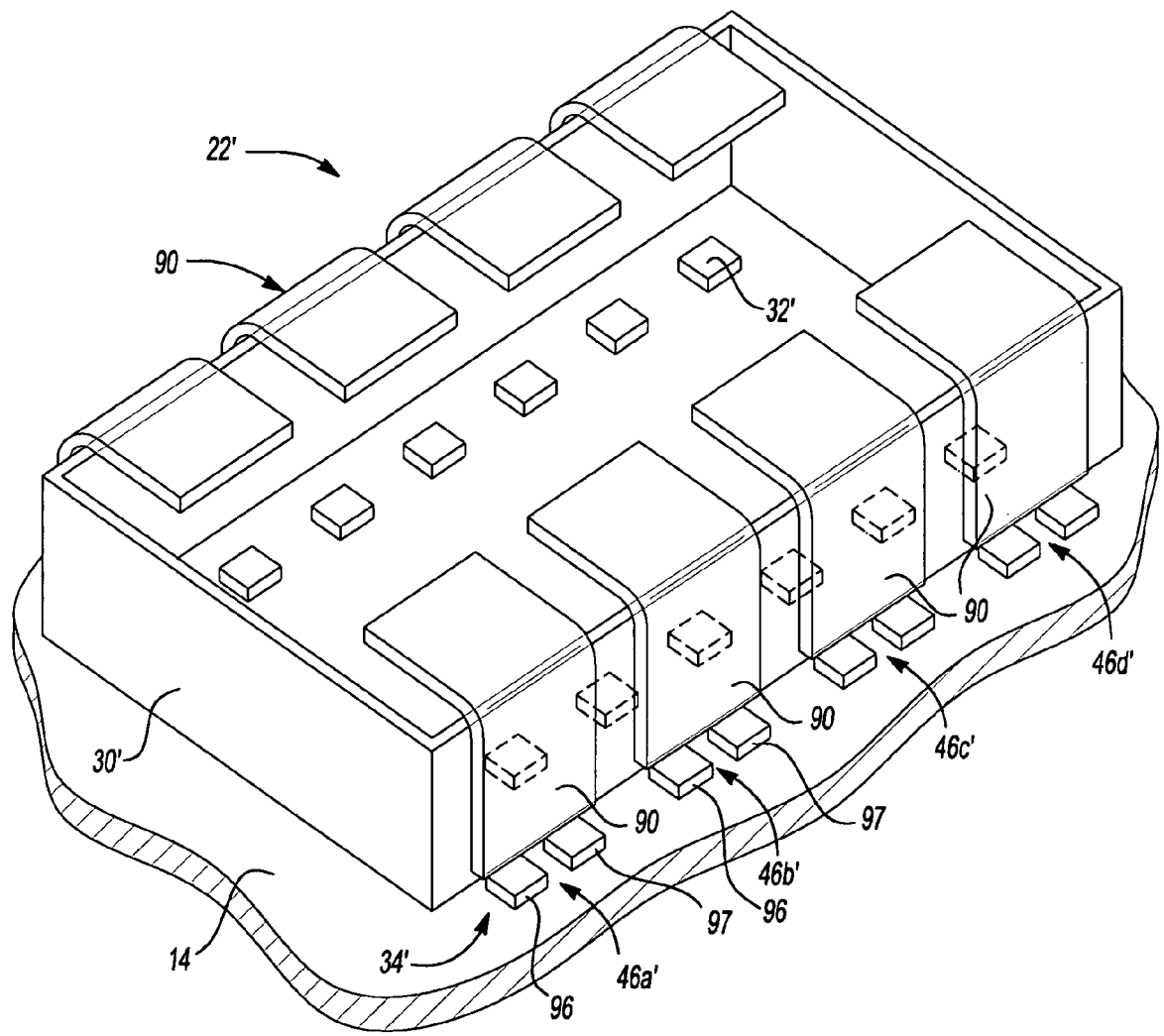
FIG. 8 is a perspective view of a portion of the display of FIG. 7.

FIGS. 7 and 8 illustrate another embodiment of the display. The display 22' can include a display housing 30', a first light source 32', a second light source 34', a plurality of telltale light guides 90 and a LCD 38. The display housing 30' can be coupled to a circuit board assembly 14' and can define a box-like container in which the first light source 32' is housed. The first light source 32' can include a plurality of white LED's that can be coupled to the circuit board assembly 14'.

The second light source 34' can include a plurality of selectively illuminated light sources (the particular example includes eight selectively illuminated light sources, but only four (i.e., 46a' through 46d') are specifically shown), and each of the selectively illuminated light sources can be coupled to the circuit board assembly 14'. The selectively illuminated light sources can include one or more of any appropriate light source, such as one or more LED's, OLED's, Polymer LED's and/or incandescent lamps. In the particular example provided, the selectively illuminated light sources 46a' through 46h' include a green LED 96 and a red LED 97.

The telltale light guides 90 can be coupled to the display housing 30' and can be employed to collect light from an associated one of the selectively illuminated light sources and transmit the collected light so that it can be employed to back-light an associated portion of the LCD 38.

Operation of the display 22' is similar to that which is described in conjunction with the above embodiment. When data from the first set of information is to be displayed, the first light source 32' can be employed to back illuminate the LCD 38. When telltales are to be displayed, the second light source 34 can be employed to selectively back-light one or more portions of the LCD 38 with light of an appropriate color. It will be appreciated that in the particular example provided, the second light source 34 is configured to transmit light along a light transmission path 58b'.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A vehicle display comprising:
   a display housing, a liquid crystal display (LCD), a display light guide,
   a first light source and a second light source, the display housing defining a plurality of telltale apertures, the LCD being coupled to the display housing and including a display screen, the display screen including a first portion, which is selectively operable for displaying a first set of vehicle data, and a plurality of second portions that are selectively operable for displaying a second set of vehicle data, the display light guide being disposed between the LCD and the first and second light sources, the first light source being selectively operable such that light generated by the first light source is transmitted through the display light guide and back illuminates the first portion of the display screen, the second light source being comprised of a plurality of light source sets, each of the light source sets being received in an associated one of the telltale apertures and being selectively operable such that light generated by each of the light source sets is transmitted through the display light guide and back illuminates an associated one of the second portions of the display screen;

wherein the second set of vehicle data consists of symbols, wherein the display housing includes a predetermined quantity of telltale apertures and wherein at least one of the second portions of the display screen toggles between two or more symbols when a quantity of symbols to be displayed exceeds the predetermined quantity of telltale apertures;

wherein one of the first and second light sources is configured to transmit the light generated therefrom directly through the display light guide without altering a direction of the light generated by the one of the first and second light sources; and wherein the other one of the first and second light sources is configured to transmit the light generated therefrom into the display light guide in a manner that causes the display light guide to alter a direction of the light generated by the other one of the first and second light sources.

2. The vehicle display of claim 1, wherein each of the light source sets includes a means for generating light of a first color and a means for generating light of a second color.

3. The vehicle display of claim 2, wherein the second color is common between each of the light source sets.

4. The vehicle display of claim 3, wherein the first color is common between each of the light source sets.

5. The vehicle display of claim 1, wherein the display light guide is generally U-shaped having a body portion that is disposed over the telltale apertures.

6. The vehicle display of claim 1, wherein the LCD includes a display diffuser that collects light emitted forwardly from the display light guide.

7. The vehicle display of claim 1, wherein the display light guide includes at least one reflecting surface that traverses a light transmission path, the at least one reflecting surface reflecting light outwardly from the display light guide.

8. The vehicle display of claim 7, wherein the light generated by the first light source is transmitted along the light transmission path.

9. The vehicle display of claim 1, further comprising a gauge housing, a circuit board coupled to the gauge housing, a motor assembly coupled to the circuit board and a pointer driven by the motor assembly, the display housing being coupled to one of the circuit board and the gauge housing.

10. A vehicle display comprising:
a housing;
a circuit board coupled to the housing;
a motor assembly coupled to the circuit board;
a pointer driven by the motor assembly; and
a display having a display housing, a liquid crystal display (LCD), a display light guide, a first light source and a second light source, the display housing segregating the first light source from the second light source, the LCD being coupled to the display housing and including a display screen, the display screen including a first portion, which is selectively operable for displaying a first set of vehicle data, and a plurality of second portions that are selectively operable for displaying a second set of vehicle data, the display light guide being disposed between the LCD and the first and second light sources, the first light source being selectively operable such that light generated by the first light source is transmitted through the display light guide and back illuminates the first portion of the display screen, the second light source being comprised of a plurality of light source sets, each of the light source sets being selectively operable such that light generated by each of the light source sets is transmitted through the display light guide and back illuminates an associated one of the second portions of the display screen wherein the second set of vehicle data consists of symbols, wherein the display housing includes a predetermined quantity of telltale apertures and wherein at least one of the second portions of the display screen toggles between two or more symbols when a quantity of symbols to be displayed exceeds the predetermined quantity of telltale apertures;

wherein one of the first and second light sources is configured to transmit the light generated therefrom directly through the display light guide without altering a direction of the light generated by the one of the first and second light sources; and wherein the other one of the first and second light sources is configured to transmit the light generated therefrom into the display light guide in a manner that causes the display light guide to alter a direction of the light generated by the other one of the first and second light sources.

11. The vehicle display of claim 10, wherein each of the light source sets includes a means for generating light of a first color and a means for generating light of a second color.

12. The vehicle display of claim 11, wherein the second color is common between each of the light source sets.

13. The vehicle display of claim 12, wherein the first color is common between each of the light source sets.

14. The vehicle display of claim 10, wherein the display light guide includes a plurality of L-shaped guide elements.

15. The vehicle display of claim 10, wherein the LCD includes a display diffuser that collects light emitted forwardly from the display light guide.

16. The vehicle display of claim 10, wherein the display light guide includes at least one reflecting surface that traverses a light transmission path, the at least one reflecting surface reflecting light outwardly from the display light guide.

17. The vehicle display of claim 16, wherein the light generated by the second light source is transmitted along the light transmission path.

18. A vehicle display comprising:
a circuit board;
a liquid crystal display spaced apart from the circuit board;
a first set of light emitting diodes (LEDs) coupled to the circuit board, the first set of LEDs including a first LED subset and a second LED subset;
a second set of light emitting diodes (LEDs) coupled to the circuit board and disposed between the first and second LED subsets, the second set of light emitting diodes including a plurality of third LED subsets;

a housing received over the second set of LEDs between the first and second LED subsets, the housing defining a plurality of tunnels that extend between the circuit board and the liquid crystal display, each of the third LED subsets being received into an associated one of the tunnels; and a light guide disposed between the housing and the liquid crystal display and configured to receive light from the first and second LED subsets, the light guide including an arcuate surface that diffuse the light received from the first and second LED subsets;

wherein the first set of LEDs can be selectively illuminated while the third LED subsets are not illuminated to back illuminate the liquid crystal display to thereby display a first set of information and wherein each of the third LED subsets can be selectively illuminated while the first set of LEDs is not illuminated to back illuminate portions of the liquid crystal display that are directly in-line with the tunnels to thereby display a second set of information that is different from the first set of information.

19. The vehicle display of claim 18, further comprising a rotary pointer and wherein the liquid crystal display is disposed in an area that is radially inward of the rotary pointer.

20. The vehicle display of claim 18, wherein the first set of LEDs are configured to produce light of a first color and the second set of LEDs are configured to produce light of a second color that is different from the first color.

* * * * *